United States Patent [19]
Spencer

[11] 3,909,224
[45] Sept. 30, 1975

[54] FILTER

[76] Inventor: Victor Vernon Spencer, P.O. Box 368, Tillsonburg, Ontario, Canada

[22] Filed: Jan. 4, 1974

[21] Appl. No.: 430,739

[30] Foreign Application Priority Data
Feb. 5, 1973   Canada ................................ 162925

[52] U.S. Cl. ...................... 55/482; 55/491; 55/522; 55/DIG. 6; 156/197; 161/68
[51] Int. Cl.² .......................................... B01D 46/00
[58] Field of Search .............................. 55/485–489, 55/491, 522, 525, 482, DIG. 16; 156/197, 198, 256; 161/68

[56] References Cited
UNITED STATES PATENTS
2,037,164   4/1936   Harrah .................................. 55/489
2,493,726   1/1950   O'Day ................................... 55/525
3,252,213   5/1966   Cuta ..................................... 55/491

FOREIGN PATENTS OR APPLICATIONS
872,245   7/1961   United Kingdom ................... 55/489

*Primary Examiner*—Bernard Nozick
*Attorney, Agent, or Firm*—Finnegan, Henderson, Farabow and Garrett

[57] ABSTRACT

A method of manufacturing a filter media having plyed sections of obliquely oriented honeycomb cells is disclosed as well as a novel filter media of stacked sections of obliquely oriented honeycomb cells.

4 Claims, 3 Drawing Figures

FILTER

This invention relates to an improved filter media and to a method of making the same.

It is an object of the invention to provide a filter media of low resistance to fluid flow but with a high affinity to capture particles entrained in the fluid flow.

It is a further object of the invention to employ the principal of centrifugal force in the use of a stationary filter media to capture particles entrained in a fluid flowing through the filter media.

It is a further object of the invention to utilize a modified honeycomb section as an element of the filter media, and more particularly a uniquely modified honeycomb having the axis of its cells disposed at an oblique angle relative to the median plane of the section, while the individual cells are crushed into an open web configuration.

The invention therefore contemplates a filter media having a plurality of stacked, crushed honeycomb sections in relative juxtaposition wherein each section has a plurality of open cells with the walls thereof crushed in the plane of the section, the axis of the crushed cells being disposed at oblique angles relative to the media of the plane of the section.

The invention further contemplates that the relative sections be reversely disposed whereupon the oblique axis of crushed cells of one section generally intersect those axis of cells of the next adjacent section, substantially orthogonally.

The invention further contemplates a method of manufacturing the filter media having a plurality of stacked, crushed honeycomb sections in relative juxtaposition comprising the steps of:

a. selecting a honey comb section having the axis of its cells disposed at an oblique angle relative to the media plane of the section;
b. extending the honeycomb of step (a) until the cells thereof are in open configuration;
c. crushing the cells of the extended honeycomb of step (b) into the plane of the honeycomb to dispose the axis of the cell more obliquely to the plane;
d. plying sections of the crushed honeycomb to form a filter media.

The present invention will now be described by way of example with reference to the accompanying drawings in which:

FIG. 1 discloses, schematically, one suitable apparatus for creating a source of honeycomb employed in the embodiments of the invention hereof.

Figure 1:
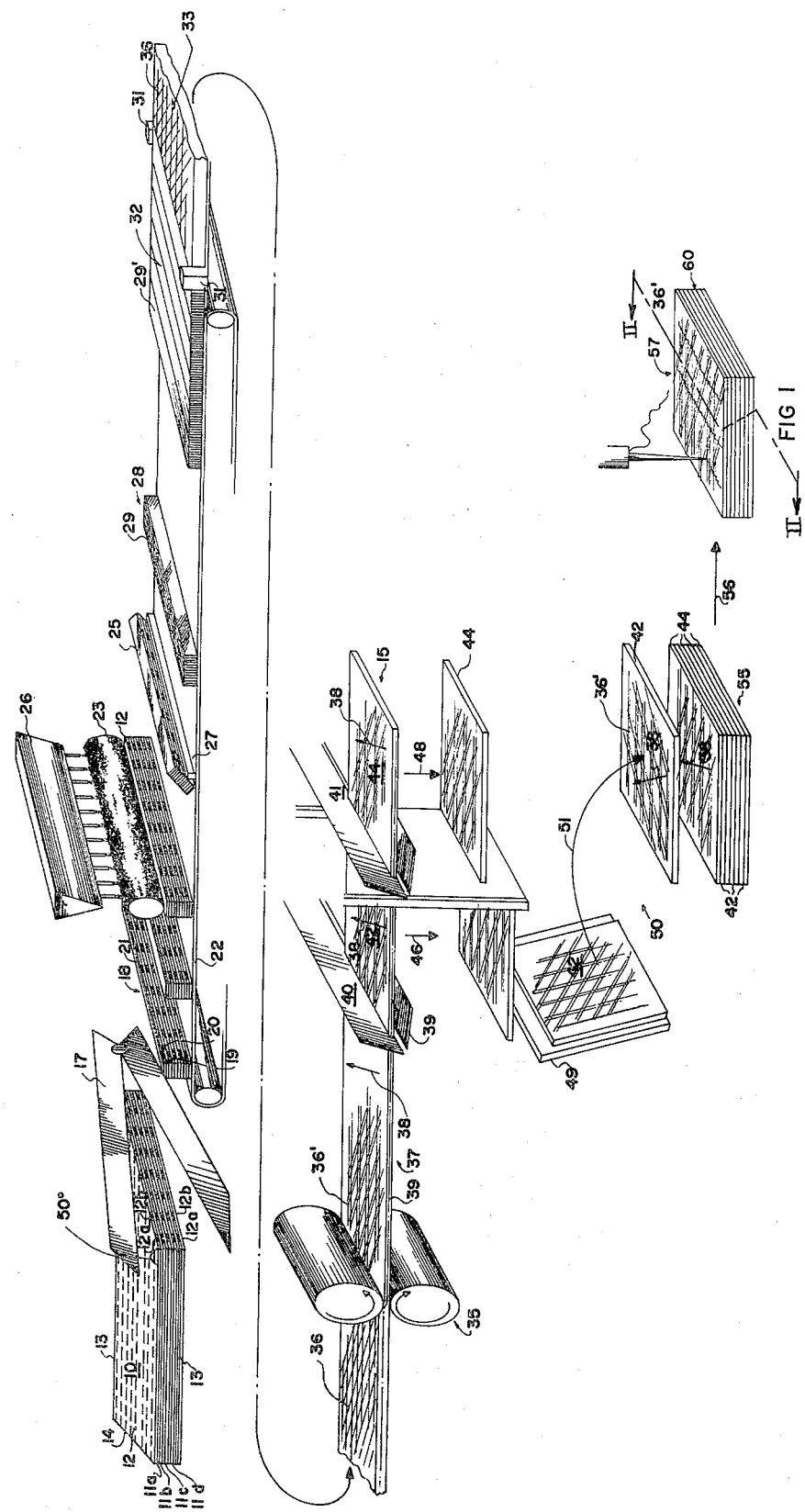
Figure 2:
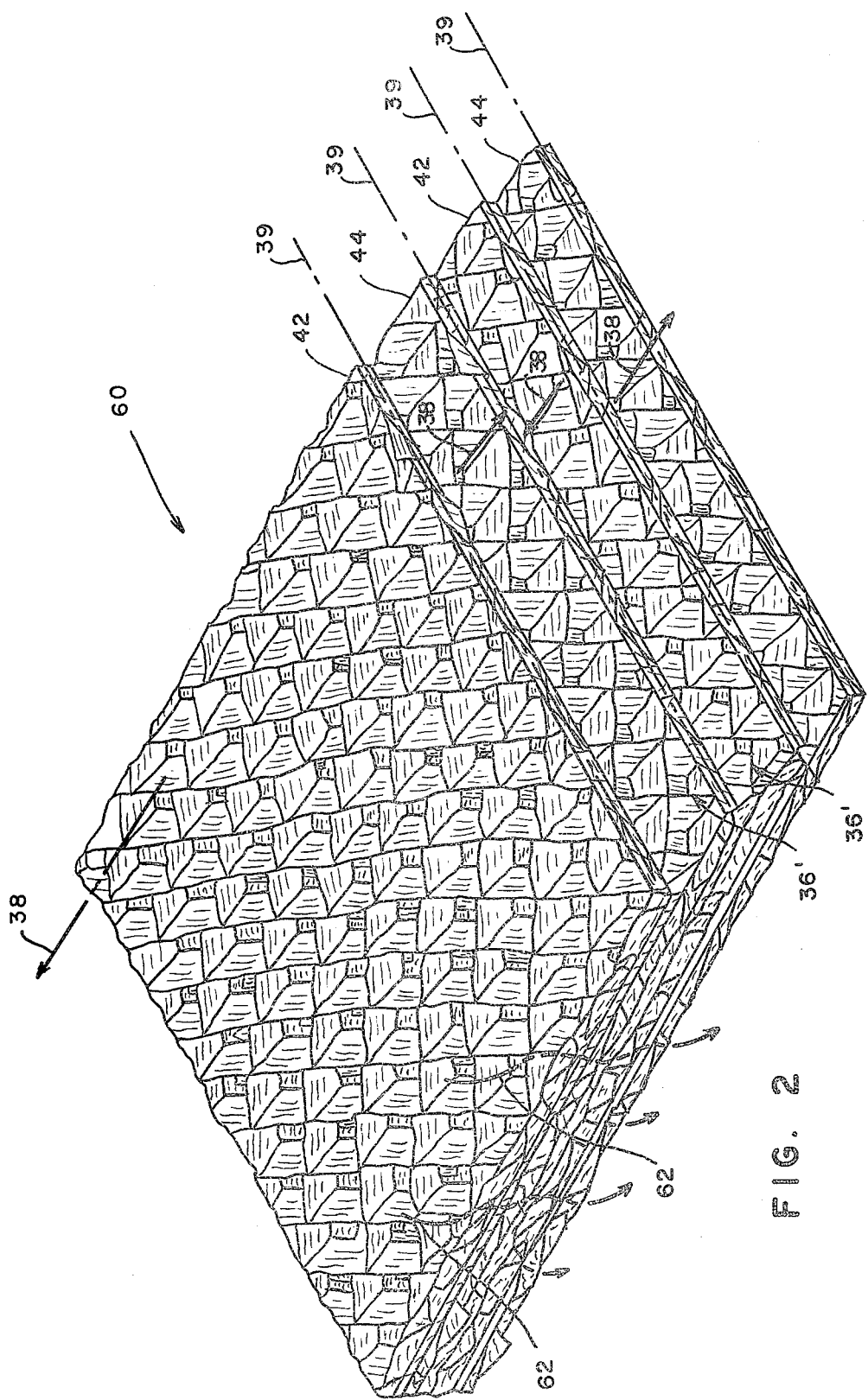
FIG. 2 is an exploded view of the filter medium, one margin, thereof being in section along lines II—II of FIG. 1.
Figure 3:
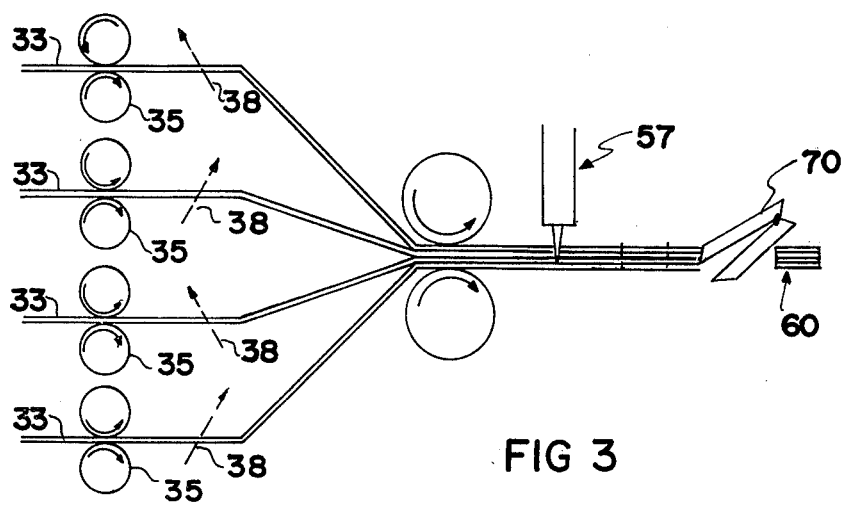
FIG. 3 is a schematic of an alternative embodiment of plying the honeycomb sections.

Referring to FIGS. 1, 2, and 3, a source of honeycomb section 15, wherein the axis, 38, of the cells, 36′, of the honeycomb when crushed, are disposed at oblique angles of about 30° relative to the media of the plane of the section may be produced in the following manner; that is to say, a source pad 10 of plyed paper sheets 11 having a plurality of glued regions or lines disposed parallel to the sides 13 of the sheets 11 may be employed as the original source of honeycomb sections 15. As such the inner sheets 11$b$, 11$c$, 11$d$ . . . have respective glue lines 12 disposed on one surface 12$a$, in interspacial relation to those glue lines 12$b$ on the opposite side of the same sheet 11$b$. The axis of the cells are orthogonal to the media of the plane of the honeycomb if the pad 10 were to be expanded in a conventional manner (not shown). If such extension were performed, however, the cells axis would be parallel to the side 13 and orthogonal to the end 14 of the pad because the glue lines 12 are respectively parallel to the side 13. Since the glue lines 12 have certain width, approximately one-eighth of an inch, the resultant cells of honeycomb have walls essentially of sinisoidal configuration rather than straight wall and rectangular honeycomb cross-section as those of a honeycomb of bees.

Skewd cells, or cells whose central axis is oblique to the plane of the open face of the cells (hence oblique to the plane of the section of the honeycomb) may be produced from the pad 10 in the following manner. An end of the pad 10 is cut by an appropriate guillotine knife 17 along a skew, preferably approximately 30° (27.5°) to create a trapezoidal-like section of honeycomb disposing on each of its vertical surfaces compressed cells 19 each having central axis 20 skewd (approximately 30°) to the plane, end surface, and hence skewd to the media of the plane 21 of the section 18.

The trapezoidal section 18 is then conveyed by a moving belt 22 under an application roller 23 with which the upper surface 12 of the section 18 comes in contact to receive a coating 25 of adhesive; the roller 23 is replenished from an adhesive containing reservoir 26. Next, the section 18 comes in contact with a trip bar 27 which causes the section to fall on its side as at 28 to dispose the faces of the compressed cells 19 upward. The tripped section 29 then comes into contact, along its adhesive surface 25, with the back of the immediately preceding tripped section 29′ whereupon the two sections 29 and 29′ become bonded together. The bonding is enhanced by the co-operation of a friction side runner 31 which constrains the compressed sections 29 and the frictional forces generated by the moving belt 22 urging the various sections 29 against one another to enhance bonding; as such, the bonded sections 29 now form a large body 32 of skewd honeycomb cell source material composed essentially of the serially bonded sections 29.

In one embodiment, continuing our reference to FIG. 1, the compressed source material 32 is, downstream from the frictional side runners 31, expanded, by use of a nip roller 35 opening the closed cells 19 into open cells 36 of open honeycomb source material 33, while also crushing the cells 36 as they pass between the nip rollers 35. More accurately, the walls of the open cells 36, in the vicinity of the glue lines are distorted or crimped (stretched) by the compaction of the nip rollers 35 to plicate them into "crushed cells" 36′ in open configuration as at 37. There, the material disposes crushed honeycomb cells 36′, the axis 37 of each of the crushed cells 36′ disposed more oblique and approximating 80° to 90°, to the plane of the open face of the cells (hence more oblique to the plane 39 of the honeycomb material itself). Thereafter, the material passes into a double cutting region where sequential guillotine knives 40 and 41 sever the crushed honeycomb material 36′ into two sections 42 and 44 which fall as indicated by the respective arrows 46 and 48. The section 42, when falling, hits one of its margins along an inclined trip plate 49 to fall as at 50. The trip plate 49 then flips the trip section 42′ as indicated by the arrow 51 to place the section 42 upside down on the plyed stack 55 in relation to the immediate subjacent and superadjacent sections 44. The plyed stack 55 is then (after a suitable thickness is achieved of sections 42 and 44 as may be required) moved as at 56 into a stitching station 57 where the stack is then stitched into a plyed filter media 60.

Referring to FIG. 2 and a representative cross-section of the media 60, the same is composed of a plurality of plyed sections 42 and 44, wherein the plane 39 of the respective sections lies essentially parallel. The central axis 38 of each crushed cell 36' is oblique to that of the plane 39 and preferably the filter material is arranged so that each adjacent section 42 and 44 has the axis of its respective crushed cells 36' reversed so that the axis essentially intersect, preferably approximately at right angles, as noted in FIG. 2.

The purpose of crushing the walls of the open cells 36 is to enhance the angle of the centre axis of each cell. When the sections are reversingly plyed the essentially orthogonal intersection of these axis 38 causes a fluid such as air 62 which passes through the media is to be imparted with centrifical forces whereupon particles entrained in the air are "spun out" to collect on the cell wall surfaces.

The plyed filter media 60 may alternatively be made according to FIG. 3, wherein, for example, four sources of expanded honeycomb source material 36 respectively and adjacently disposing axis in opposite directions are plyed into juxtaposed layers 65 then stitched at stitching station 57 and subsequently severed by guillotine knives 70 into plyed filter media 60. Any other alternative method may also be used, as those skilled in the art will now appreciate, without departing from the spirit of the invention.

The embodiments of the invention in which an exclusive property or privilege is claimed are defined as follows:

1. A filter media having a plurality of stacked, crushed honeycomb layers of nonaligned uniform cells, said media including means holding the layers in relative juxtaposition wherein each layer is composed of a plurality of overlapping, generally open cells, each cell with circumscribing walls of substantial depth defining a cell axis, said walls generally flattened and lying in the relative plane of the layer, and at least one of the walls disposed in overlapping relationship to one of adjacent cells of the layer, the axis of the crushed cells being disposed at oblique angles relative to the media of the plane of the layer.

2. The media of claim 1 wherein the relative sections are reversingly juxtaposed whereupon the oblique axis of crushed cells of one section generally intersect an axis of a crushed cell of the next adjacent section.

3. The filter media of claim 1 wherein the intersection of the axis is relatively approximately 90°.

4. The media of claim 3 including thread means for stitchably holding the juxtaposed sections together.

* * * * *